（12）United States Patent
Ciano et al.

(10) Patent No.: US 8,055,737 B2
(45) Date of Patent: Nov. 8, 2011

(54) METHOD AND SYSTEM FOR IMPROVEMENTS IN OR RELATING TO OFF-LINE VIRTUAL ENVIRONMENTS

(75) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/495,959

(22) Filed: Jul. 1, 2009

(65) Prior Publication Data
US 2010/0017512 A1    Jan. 21, 2010

(30) Foreign Application Priority Data
Jul. 21, 2008 (EP) .................... 08160798

(51) Int. Cl.
*G06F 15/16* (2006.01)
(52) U.S. Cl. .......................... 709/220; 718/1
(58) Field of Classification Search .......... 709/227, 709/220; 718/1
See application file for complete search history.

(56) References Cited

U.S. PATENT DOCUMENTS

| | | | |
|---|---|---|---|
| 6,233,618 B1 * | 5/2001 | Shannon | 709/229 |
| 2005/0267954 A1 * | 12/2005 | Lewis et al. | 709/221 |
| 2005/0268336 A1 * | 12/2005 | Finnegan | 726/15 |
| 2006/0136720 A1 | 6/2006 | Armstrong | |
| 2007/0124434 A1 * | 5/2007 | Smith et al. | 709/220 |
| 2007/0220121 A1 * | 9/2007 | Suwarna | 709/220 |
| 2008/0163207 A1 * | 7/2008 | Reumann et al. | 718/1 |
| 2008/0250407 A1 * | 10/2008 | Dadhia et al. | 718/1 |
| 2009/0241194 A1 * | 9/2009 | Thomas | 718/1 |
| 2009/0249354 A1 * | 10/2009 | Yamaguchi et al. | 718/1 |

OTHER PUBLICATIONS

MICROSOFT Tech Net—"Offline Virtual Machine Servicing Tool 2.0.1", Published Dec. 8, 2008. http://technet.microsoft.com/en-us/library/cc501231.aspx.
McAfee, Inc. Supports Network Access Protection and Virtualization in Windows Server 2008. http://www.mcafee.com/us/about/press/corporate/2008/20080227_181010_q_html.

* cited by examiner

*Primary Examiner* — Ajay Bhatia
(74) *Attorney, Agent, or Firm* — Garg Law Firm, PLLC; Rakesh Garg; Jeffrey S. LaBaw

(57) ABSTRACT

The compliance of a virtual machine image to a set of requirements is determined during a process to potentially introduce the virtual machine image into a network. One or more virtual machine images are identified. During compliance testing, the identified virtual machine image is controlled such that it cannot connect to the network. One or more tests are carried out to determine if the virtual machine image is compliant with one or more predetermined requirements. If a virtual machine is compliant with said one or more predetermined requirements, the virtual machine image is connected to the network.

20 Claims, 2 Drawing Sheets

METHOD AND SYSTEM FOR IMPROVEMENTS IN OR RELATING TO OFF-LINE VIRTUAL ENVIRONMENTS

FIELD OF THE INVENTION

The present invention relates to a method and system for improvements in or relating to off-line virtual environments, particularly in respect of compliance management of off-line virtual environments.

BACKGROUND ART

Many software virtualization products exist in the market today. The software virtualization products typically provide host software (for example, a control program) which creates a simulated computer environment, often referred to as a virtual machine, for so-called "guest software". Guest software is often a complete operating system running as if it were installed on a stand alone hardware platform. Many different virtual guest machines may be simulated on a single physical host machine and each virtual machine can be activated, suspended, shutdown, cloned or moved as required. The effect of some of these activities can have a detrimental effect on the IT infrastructure of an organization. For example, if a virtual machine image is either suspended or shut down, the in-memory representation of the virtual machine is unloaded from the host machine. The content of the virtual machine is stored in a set of files on the filesystem of the host computer. This content may include vital resources and settings, such as the CPU, memory settings, devices, hard disk content etc.

In the example of a virtual machine image implemented by a virtual machine software provider, such as VMWare, the following are typically found:

a .nvram file which includes resource settings such as CPU, memory, Virtual devices etc.;
  one or more .vmdk files each for simulated hard drive settings, for example the settings of a filesystem; and
  a .vmx file with virtual machine customization settings.

Accordingly, once the virtual machine image is completely shut down, it can be managed as appropriate by managing the above mentioned set of files. The management may include versioning, archiving, cloning, provisioning, etc. The files include all information relating to the operating system, all the installed software and related settings and any other appropriate information or data relating to the virtual machine.

Subsequently, if the virtual machine is restored and reconnected with the other physical and virtual machines on the network it is possible that they may include potentially harmful content. For example, security exposures, viruses, unlicensed software, events which have changed the files such that they are not in compliance with the current IT requirements for the network, etc. As a consequence, it is important to determine if the virtual machine image is "good" or "bad". In addition, it is important to determine whether the virtual machine image includes the appropriate levels of anti-virus software, firewalls and security setting, license compliance tools and any other appropriate elements that indicates that the virtual machine will comply with the network. In order for this to be carried out, the virtual machine can consume significant resources from the virtual machine environment; and, if found to be non-compliant while being tested or verified, can trigger undesirable noncompliance events or security issues.

In the past, the typical scenario has been to restore and test a virtual machine in a closed virtual environment. This is time-consuming and requires effort before it is even decided whether it is worth repairing or updating the virtual machine rather than creating a new virtual machine image. The fact that the virtual machine is being restored and tested in a network environment can have negative impacts on the level of security and compliance especially during any security audits in respect of the network. In addition, in certain cases virtual machines to be used for demo purposes or commercial virtual applications can also be found and downloaded from the Internet. These machines are already configured and may not comply with the network concerned and the company security rules. Since more and more of these types of applications are occurring the above issues relating to security and compliance are being encountered more and more frequently.

US 2006/0136720 discloses a virtual machine scanning system that works on an active virtual machine created with a cloning operation from the original virtual machine or taking a snapshot of the running virtual machine. As the virtual machine is active the system does not solve the problem associated with compliance and security issues that arise when bringing a virtual machine back on-line after it has been dormant.

A web page associated with an off-line virtual machine servicing tool executive overview http://technet.microsoft-.com/en-us/library/cc501231.aspx discloses an off-line virtual machine servicing tool and how it may be used in various business scenarios. Whilst this discloses some solutions to some problems mainly related to provide a way to automate the process of updating the virtual machines, it does not address all the issues associated with "reinstating" a dormant virtual machine back into a network.

Similarly, McAfee discloses the feature of security management of virtual machines in an off-line state http://www-.mcafee.com/us/about/press/corporate/2008/20080227_181010_q.html. Again, this document solve certain problems that does not address all the issues associated with "reinstating" a dormant virtual machine back into a network.

SUMMARY OF THE INVENTION

The present invention is directed to a method, computer product and system for determining the compliance of a virtual machine image during a process to potentially introduce the virtual machine image into a network. One or more virtual machine images are identified. During compliance testing, the identified virtual machine image is controlled such that it cannot connect to the network. One or more tests are carried out to determine if the virtual machine image is compliant with one or more predetermined requirements. If a virtual machine is compliant with said one or more predetermined requirements, the virtual machine image is connected to the network.

BRIEF DESCRIPTION OF THE DRAWINGS

Reference will now be made by way of example to the accompanying drawings, in which.

DETAILED DESCRIPTION OF THE PREFERRED EMBODIMENT

Figure 1:
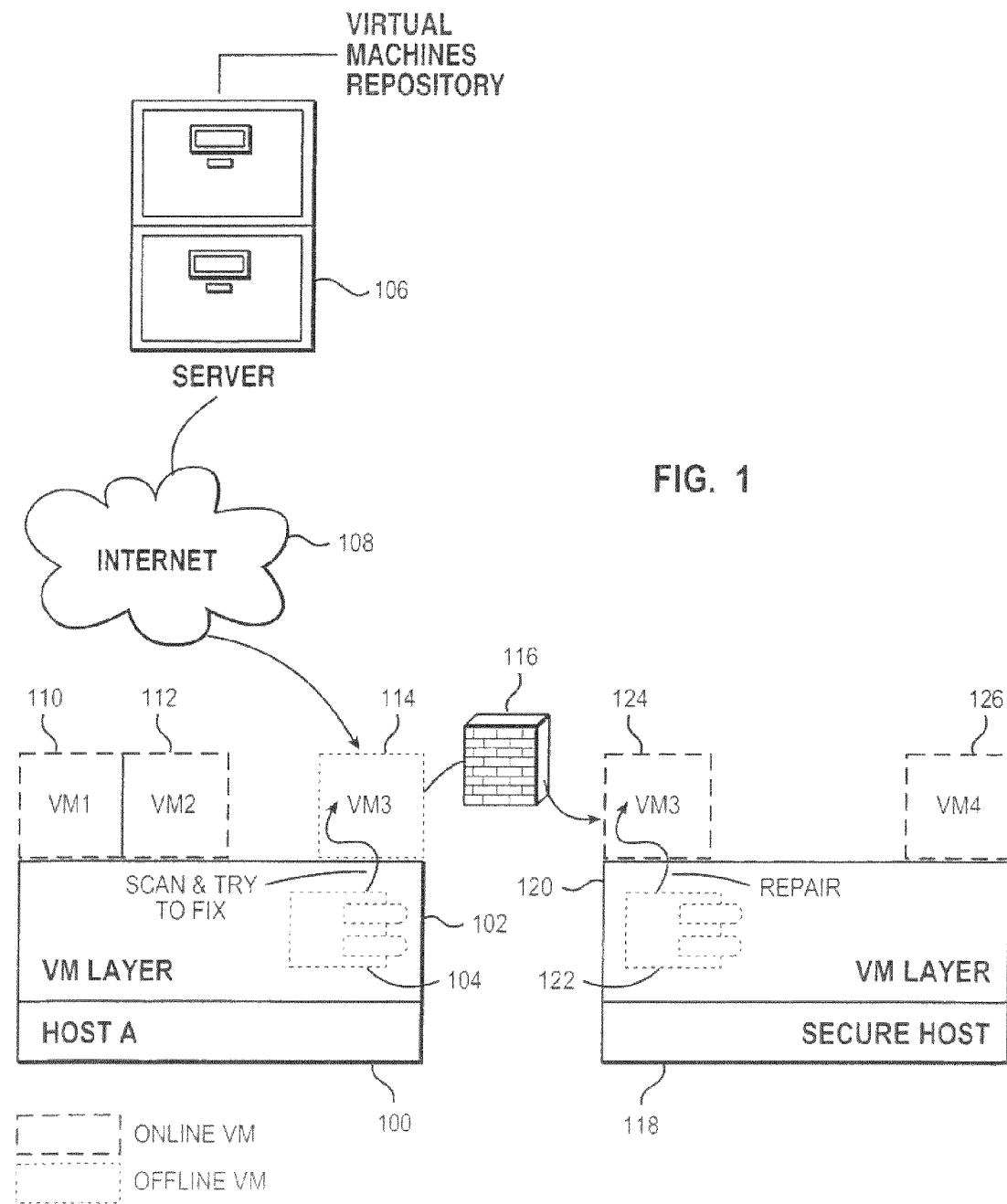
FIG. 1 is a block diagram of a system in accordance with an embodiment of the invention, by way of example.

Referring initially to FIG. 1 a system according to the present invention will now be described. The system comprises, in a first embodiment, a host 100. The host supports a virtual machine layer 102 which includes a module 104 for analyzing and attempting to fix virtual machines before they are put on-line. In addition, a virtual machine repository 106 is connected to the host by means of the Internet 108 (or any other appropriate connection). The virtual machine repository downloads virtual machines onto the virtual machine layer 102 situated on the host 100. The virtual machines shown are VM1, VM2, and VM3: 110, 112 and 114 respectively. The manner in which the virtual machines are downloaded will now be described.

In order to implement the method and system to perform efficient compliance assessment for an off-line virtual image the method relies on a particular sequencing and use of APIs and commands that a specific virtualization provider can facilitate. This is achieved by quickly filtering out non-compliant virtual machine images and where possible preventing them coming on-line.

Figure 2:
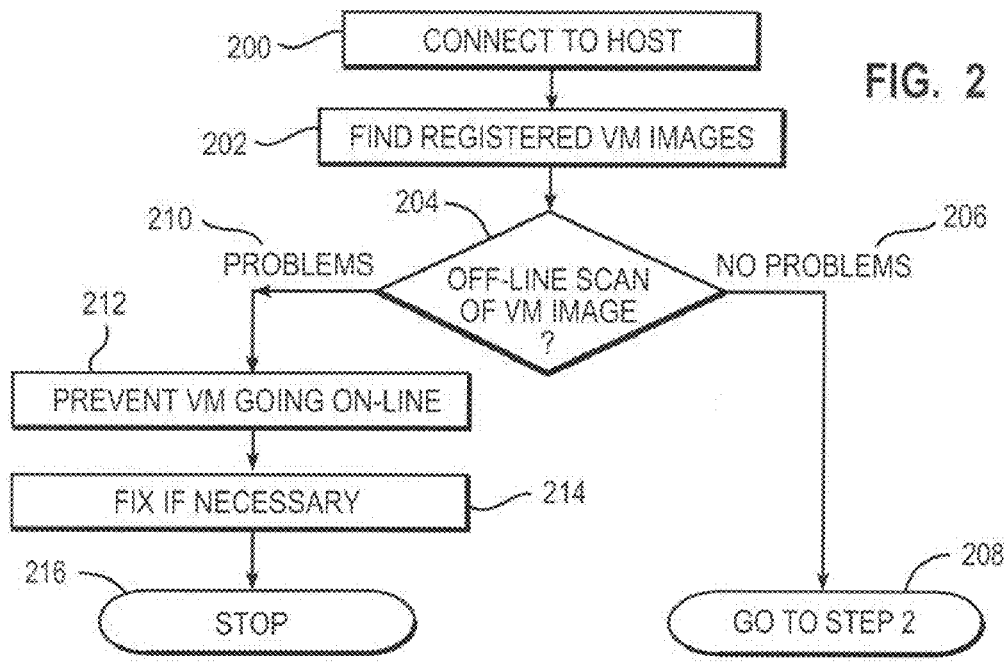
FIG. 2 is a block diagram showing the first set of method steps, in accordance with an embodiment of the invention, by way of example.

The method depends on the ability of the virtualization technology to provide APIs or commands for inspecting the virtual filesystems off-line. Step one is a preliminary step which is optional and depends on the virtualization provider inspection capabilities for the filesystem (e.g. VMWare vmdk files) of any un-powered virtual machines. As shown in FIG. 2, this includes the following sub steps:

connect to the local host, 200;
locate all registered virtual machine images, 202 (for example, by finding folders with .vmx validated files);
conduct for each virtual machine, an off-line scan of the virtual filesystem step 204. In other words, identify and scan all the .vmdk files contained in each of the above-mentioned folders.

If no problems are encountered in the off-line scan (206) the method progresses to step 2, 208, which will be described in greater detail below. If problems are encountered 210, the virtual machine image is prevented from going on-line (212). The virtual machine may then be fixed if necessary at step 214 and the process stops at step 216.

The above described step 1 may be sufficient to detect if there is any undesirable software inside any of the virtual machines. For example, if a virus signature is detected, the option of bringing the virtual machine on-line can be stopped. In addition, if undesirable software is identified at this stage it may avoid the necessity to carry out any further analysis and thereby reduce further investigation efforts.

Figure 3:
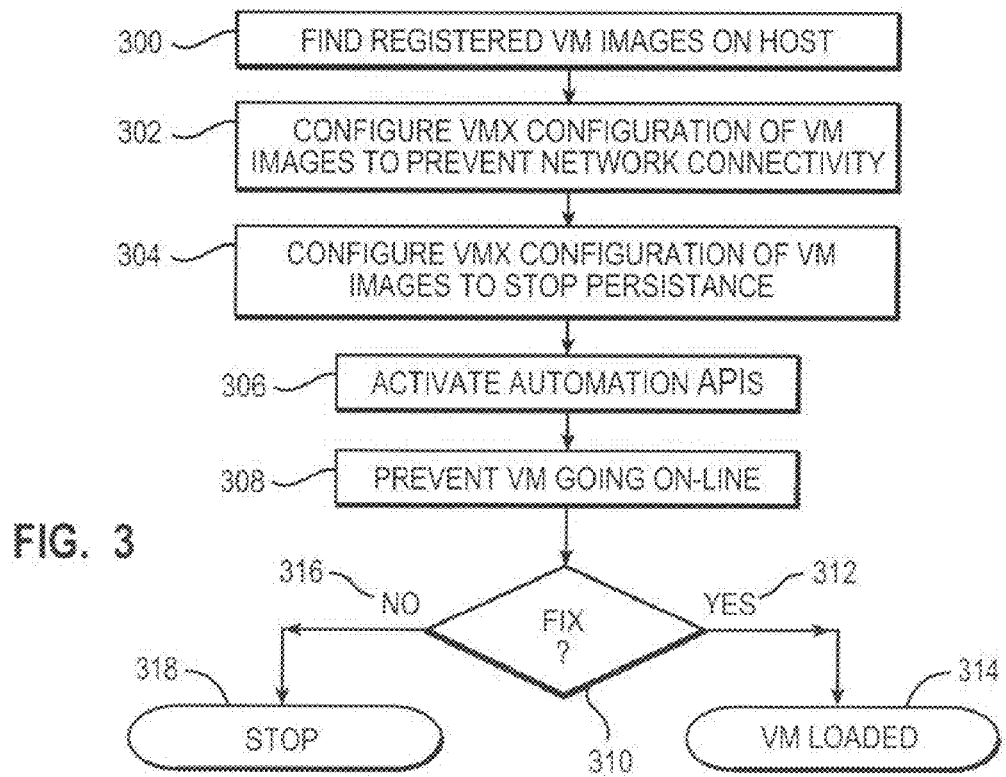
FIG. 3 is a block diagram showing a second set of method steps, in accordance with an embodiment of the invention, by way of example.

If there are no problems identified during step 1, step 2 is carried out. The step 2 will now be described with reference to FIG. 3. In this step, the virtual machine image is more deeply analyzed, although it is still not exposed to the production environment. The second step does not give rise to complex or expensive certification network requirements. Instead, the analysis is carried out by pre-configuring the virtual machine image so that it cannot access the external network and is not persistently attempting to modify its virtual filesystem (FS).

In general, the method requires the virtual machine to be powered up and for virtualization APIs to be leveraged to carry out inspections as required, with no formal inventory; or license management agent or infrastructure being required. The specific steps shown in FIG. 3 will now be described. The first step 300 locates all registered virtual machine images on the host. The subsequent steps are then carried out for each virtual machine image identified in this first step 300. Subsequent step 302 requires that the vmx configuration is set so as to prevent network connectivity. This can be represented in the following manner:

```
>
    > ethernet0.startConnected = "FALSE"
    > ethernet0.present = "FALSE"
> ..
```

In step 304 the vmx configuration is set so that the FS changes will not persist. This can be represented in the following manner:

```
>
    > ide0:0.mode = "independent-nonpersistent"
    > ide0:1.mode = "independent-nonpersistent"
> ..
```

In step 306 the automation APIs are activated and include the following sub-steps:

```
   a.   power on the VM
> VixVM_Open(localhost, "myVM.vmx", ..)
   b.   wait for VM tools to be ready
> VixVM_WaitForToolsInGuest( )
   c.   log into the VM
> VixVM_LoginInGuest( )
   d.   copy compliance sensors in the VM (e.g. sw/fs/registry
        scanners)
> VixVM_CopyFileInGuest( )
   e.   execute sensors inside VM and extract results
> VixVM_RunProgramInGuest( )
> VixVM_CopyFileFromGuest( )
   f.   power off the VM
> VixVM_PowerOff( )
```

By carrying out the above-mentioned sub steps, the virtual machine image has been powered up, populated with appropriate sensors or tests and scanned or tested for a series of compliances. In this way, the virtual machine image has remained shielded from the rest of the network environments. The appropriate sensors, tests and compliances will depend on the exact nature of the virtual machine image and the system and method used to produce the virtualization.

As a result of carrying out steps 302 and 304, no network activity originates from the virtual machine during the scan. This prevents adverse effects from occurring, for example: possible network worms, unnecessary license compliance broadcasts, unnecessary virus warning broadcasts, etc. In addition, if the virtual machine image passes the compliance check after shut down, no changes to the virtual filesystem of the virtual machine will have been effected. As such, the virtual machine remains intact and is not altered by the injected probes and the execution side-effects that they may produce.

In summary, the execution of the above-mentioned steps provides a compliance analysis and scanning methodology for off-line virtual machines. The virtual machines are unaffected by the process and are also prevented from causing any major problems in a production environment before becoming fully activated. Examples of compliance checks which may be carried out "on the fly" include, but are not limited to the following: virus detection: software and mandatory patch installation; detection and software compliance based on the software installed. This may also include the license entitlements and guarantees, and the fact that all virtual machines hosted on the same system are similar.

Returning now to FIG. 3 after automation in the APIs has been activated, if appropriate the virtual machine is prevented from going on-line at step 308. At step 310, a decision is made as to whether or not to fix the virtual machine if there are errors or problems associated therewith. If the virtual machine is fixed (yes, step 312) the virtual machine may subsequently be loaded into the network at step 314. This may occur after a further re-run of the earlier steps in FIG. 3 in order to guarantee that the virtual machine is now "good". If a decision is made not to fix the virtual machine or indeed the virtual machine cannot be fixed (no, step 316) then the process is stopped at step 318 and the virtual machine image is isolated.

Returning now to FIG. 1, where major problems are identified for a particular virtual machine, this can either be destroyed or isolated as above-mentioned. The isolation can take place in a specific quarantine area which is separated from the host by means of an appropriate firewall 116 or other security means. The specific quarantine area can include a secure host which is similar to hostA. The secure host 118 includes a virtual machine layer 120 and repair and scanning capabilities 122. As is shown in FIG. 1, VM3 has been transferred to the secure host from hostA in order to ensure that VM3 does not have any adverse effects on the whole network. The secure host may include its own logical storage, VPN, etc. Later, the virtual machine image can be safely networked and updated after all the security issues and software compliancy problems have been fixed.

It will be appreciated that there will be included in the system modules which carry out each of the functional steps of the method: for example, a testing module which carries out the various compliance or security checks or tests. Other modules will be apparent from the functions they carry out.

The present invention provides a number of advantages. One of the advantages is that the virtual machine image is prevented from going on-line in the network until all security and compliance of the concerns have been met. The automation APIs can be adapted to suit the circumstances of the virtual machine images and the virtualization system process being used. There is no requirement to use time-consuming and expensive on-line resources in order to validate the virtual machine image. By isolating "bad" virtual machine images, time can be taken in an off-line environment to repair or fix the virtual machine image to avoid risks to the network.

It will be appreciated that examples other than those described above may exist, which fall within the scope of the present invention. For example, the steps may take place in different orders and by different modules. As used herein, the singular forms "a", "an" and "the" are intended to include the plural forms as well, unless the context clearly indicates otherwise.

The invention claimed is:

1. A method of determining the compliance of a virtual machine image during a process to potentially introduce the virtual machine image into a computer network, the method comprising:
   identifying the virtual machine image;
   controlling the virtual machine image such that the virtual machine image cannot connect to the network;
   configuring the virtual machine image such that a change made to a file system of the virtual machine image for a compliance test will not persist after a virtual machine corresponding to the virtual machine image is powered off;
   carrying out the compliance test to determine whether the virtual machine image is compliant with a predetermined requirement; and
   connecting the virtual machine image to the computer network responsive to the virtual machine image being compliant with the predetermined requirement.

2. The method of claim 1, further comprising:
   isolating the virtual machine from the network responsive to the virtual machine image not being complaint with the predetermined requirement.

3. The method of claim 2 wherein isolating the virtual machine comprises connecting the virtual machine to a secure host.

4. The method of claim 1 further comprising:
   determining, responsive to the virtual machine image not being in compliance with the predetermined requirement, a manner of bringing the virtual machine image into compliance with the predetermined requirement.

5. The method of claim 4, further comprising:
   repairing the virtual machine image.

6. The method of claim 5, further comprising:
   retesting, after the repairing, the virtual machine image; and
   connecting the virtual machine image to the computer network responsive to the retesting resulting in the virtual machine image being complaint with the predetermined requirement.

7. The method of claim 1, wherein carrying out the compliance test comprises:
   activating an automation API in the virtual machine corresponding to the virtual machine image;
   copying a compliance test to the file system of the virtual machine corresponding to the virtual machine image;
   executing the compliance test on the virtual machine corresponding to the virtual machine image; and
   powering off the virtual machine corresponding to the virtual machine image, wherein the powering off causes the compliance test copied to the file system to not persist in the file system for a next powering on of the virtual machine corresponding to the virtual machine image.

8. A system for determining the compliance of a virtual machine image during a process to potentially introduce the virtual machine image into a network, the comprising:
   a processor;
   a memory for storing instructions which when executed by the processor execute a method comprising:
   identifying the virtual machine image;
   controlling the virtual machine image such that the virtual machine image cannot connect to the network;
   configuring the virtual machine image such that a change made to a file system of the virtual machine image for a compliance test will not persist after a virtual machine corresponding to the virtual machine image is powered off;
   carrying out the compliance test to determine whether the virtual machine image is compliant with a predetermined requirement; and
   connecting the virtual machine image to the computer network responsive to the virtual machine image being compliant with the predetermined requirement.

9. The system of claim 8, further comprising:
   isolating the virtual machine from the network responsive to the virtual machine image not being complaint with the predetermined requirement.

10. The system of claim 9, wherein isolating the virtual machine comprises connecting the virtual machine to a secure host.

11. The system of claim 8, further comprising:
  determining, responsive to the virtual machine image not being in compliance with the predetermined requirement, a manner of bringing the virtual machine image into compliance with the predetermined requirement.

12. The system of claim 8, wherein carrying out the compliance test comprises:
  activating an automation API in the virtual machine corresponding to the virtual machine image;
  copying a compliance test to the file system of the virtual machine corresponding to the virtual machine image;
  executing the compliance test on the virtual machine corresponding to the virtual machine image; and
  powering off the virtual machine corresponding to the virtual machine image, wherein the powering off causes the compliance test copied to the file system to not persist in the file system for a next powering on of the virtual machine corresponding to the virtual machine image.

13. A computer program product in a non-transitory computer-usable medium comprising instructions for carrying out a method when said computer program is executed on a computer system, the method comprising:
  identifying the virtual machine image;
  controlling the virtual machine image such that the virtual machine image cannot connect to the network;
  configuring the virtual machine image such that a change made to a file system of the virtual machine image for a compliance test will not persist after a virtual machine corresponding to the virtual machine image is powered off;
  carrying out the compliance test to determine whether the virtual machine image is compliant with a predetermined requirement; and
  connecting the virtual machine image to the computer network responsive to the virtual machine image being compliant with the predetermined requirement.

14. The product of claim 13, further comprising:
  isolating the virtual machine from the network responsive to the virtual machine image not being complaint with the predetermined requirement.

15. The product of claim 14 wherein isolating the virtual machine comprises connecting the virtual machine to a secure host.

16. The product of claim 13, further comprising:
  determining, responsive to the virtual machine image not being in compliance with the predetermined requirement, a manner of bringing the virtual machine image into compliance with the predetermined requirement.

17. The product of claim 16, further comprising repairing the virtual machine image.

18. The product of claim 17, further comprising:
  retesting, after the repairing, the virtual machine image; and
  connecting the virtual machine image to the computer network responsive to the retesting resulting in the virtual machine image being complaint with the predetermined requirement.

19. The product of claim 16, further comprising:
  repairing the virtual machine image;
  retesting, after the repairing, the virtual machine image; and
  connecting the virtual machine image to the computer network responsive to the retesting resulting in the virtual machine image being complaint with the predetermined requirement.

20. The product of claim 13, wherein carrying out the compliance test comprises:
  activating an automation API in the virtual machine corresponding to the virtual machine image;
  copying a compliance test to the file system of the virtual machine corresponding to the virtual machine image;
  executing the compliance test on the virtual machine corresponding to the virtual machine image; and
  powering off the virtual machine corresponding to the virtual machine image, wherein the powering off causes the compliance test copied to the file system to not persist in the file system for a next powering on of the virtual machine corresponding to the virtual machine image.

* * * * *